(12) United States Patent
Baglino et al.

(10) Patent No.: US 8,773,058 B2
(45) Date of Patent: Jul. 8, 2014

(54) ROTOR TEMPERATURE ESTIMATION AND MOTOR CONTROL TORQUE LIMITING FOR VECTOR-CONTROLLED AC INDUCTION MOTORS

(75) Inventors: Andrew David Baglino, San Francisco, CA (US); Greg Grant Solberg, Berkeley, CA (US); Yifan Tang, Los Altos, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 375 days.

(21) Appl. No.: 13/179,472

(22) Filed: Jul. 8, 2011

(65) Prior Publication Data

US 2012/0007532 A1      Jan. 12, 2012

Related U.S. Application Data

(60) Provisional application No. 61/362,312, filed on Jul. 8, 2010.

(51) Int. Cl.
*H02P 29/02*     (2006.01)
*H02H 7/085*     (2006.01)

(52) U.S. Cl.
USPC .......................... 318/473; 318/434; 318/806

(58) Field of Classification Search
USPC ......... 318/430–434, 471–473, 727, 806, 818, 318/820; 388/934
See application file for complete search history.

(56) References Cited

U.S. PATENT DOCUMENTS

| | | | |
|---|---|---|---|
| 3,985,110 A | 10/1976 | Doundoulakis | |
| 4,672,288 A * | 6/1987 | Abbondanti | 318/803 |
| 5,035,115 A | 7/1991 | Ptasinski | |
| 5,058,391 A | 10/1991 | Periot | |
| 5,086,264 A * | 2/1992 | Kelledes et al. | 318/798 |
| 5,291,960 A | 3/1994 | Brandenburg et al. | |
| 5,339,776 A | 8/1994 | Regueiro | |
| 5,483,807 A | 1/1996 | Abersfelder et al. | |
| 5,537,956 A | 7/1996 | Rennfeld et al. | |
| 5,542,387 A | 8/1996 | Okubo | |

(Continued)

FOREIGN PATENT DOCUMENTS

| | | |
|---|---|---|
| KR | 10-2008-0026609 | 9/2009 |
| KR | 10-2009-0101015 | 9/2009 |

OTHER PUBLICATIONS

International preliminary report on patentability, Simin Baharlou, Jan. 8, 2013 (contains abstract of 10-2008-0026609).

(Continued)

*Primary Examiner* — Bentsu Ro
(74) *Attorney, Agent, or Firm* — J. Richard Soderberg

(57) ABSTRACT

A system and method including a runtime thermal model that estimates individual component temperatures, permitting the system to only limit power when necessary or desirable. A power-limiting system for a vector-controlled AC induction motor includes a torque command system for generating a torque command; a thermal protection system determining a runtime estimate for a temperature of a component of a rotational electro-magnetic component of the vector-controlled AC induction motor; and a controller configured to generate a motor control signal for the vector-controlled AC induction motor responsive to the torque command, wherein the thermal protection system determines the runtime estimate responsive to a multi-node thermal model of the vector-controlled AC induction motor, and wherein the controller limits a power of the vector-controlled AC induction motor to maintain a component temperature below its critical temperature.

11 Claims, 3 Drawing Sheets

(56) References Cited

U.S. PATENT DOCUMENTS

| | | | |
|---|---|---|---|
| 5,584,360 | A | 12/1996 | Wedeven |
| 5,604,441 | A | 2/1997 | Freese, V et al. |
| 5,647,534 | A | 7/1997 | Kelz et al. |
| 5,669,335 | A | 9/1997 | Hollis |
| 5,680,833 | A | 10/1997 | Smith |
| 5,705,742 | A | 1/1998 | Fox et al. |
| 5,977,742 | A * | 11/1999 | Henmi ............ 318/801 |
| 5,992,481 | A | 11/1999 | Smith |
| 6,042,265 | A * | 3/2000 | Kliman et al. ......... 374/152 |
| 6,124,644 | A | 9/2000 | Olson et al. |
| 6,138,466 | A | 10/2000 | Lake et al. |
| 6,186,254 | B1 | 2/2001 | Mufford et al. |
| 6,209,331 | B1 | 4/2001 | Lake et al. |
| 6,213,233 | B1 | 4/2001 | Sonntag et al. |
| 6,216,646 | B1 | 4/2001 | Smith et al. |
| 6,305,345 | B1 | 10/2001 | Bakhtine |
| 6,347,528 | B1 | 2/2002 | Iritani et al. |
| 6,357,541 | B1 | 3/2002 | Matsuda et al. |
| 6,360,835 | B1 | 3/2002 | Skala |
| 6,394,207 | B1 | 5/2002 | Skala |
| 6,448,535 | B1 | 9/2002 | Ap |
| 6,464,027 | B1 | 10/2002 | Dage |
| 6,467,286 | B2 | 10/2002 | Hasebe et al. |
| 6,481,230 | B2 | 11/2002 | Kimishima et al. |
| 6,561,155 | B1 | 5/2003 | Williams |
| 6,569,550 | B2 | 5/2003 | Khelifa |
| 6,575,258 | B1 | 6/2003 | Clemmer |
| 6,651,761 | B1 | 11/2003 | Hrovat et al. |
| 6,708,513 | B2 | 3/2004 | Koehler et al. |
| 6,743,539 | B2 | 6/2004 | Clingerman et al. |
| 6,772,603 | B2 | 8/2004 | Hsu et al. |
| 6,797,421 | B2 | 9/2004 | Assarabowski et al. |
| 7,048,044 | B2 | 5/2006 | Ban et al. |
| 7,104,347 | B2 | 9/2006 | Severinsky et al. |
| 7,147,071 | B2 | 12/2006 | Gering et al. |
| 7,150,159 | B1 | 12/2006 | Brummett et al. |
| 7,191,858 | B2 | 3/2007 | Vanderwees et al. |
| 7,237,634 | B2 | 7/2007 | Severinsky et al. |
| 7,259,469 | B2 | 8/2007 | Brummett et al. |
| 7,570,074 | B2 * | 8/2009 | Gao et al. ............ 324/765.01 |
| 7,591,143 | B2 | 9/2009 | Zeigler et al. |
| 7,591,303 | B2 | 9/2009 | Zeigler et al. |
| 7,821,224 | B2 | 10/2010 | Baglino et al. |
| 7,847,501 | B2 | 12/2010 | Baglino et al. |
| 8,339,082 | B2 * | 12/2012 | Campbell et al. ............ 318/432 |
| 2002/0027027 | A1 | 3/2002 | Skala |
| 2002/0040896 | A1 | 4/2002 | Ap |
| 2003/0193009 | A1 | 10/2003 | Dill |
| 2003/0217876 | A1 | 11/2003 | Severinsky et al. |
| 2005/0115748 | A1 | 6/2005 | Lanier |
| 2005/0133215 | A1 | 6/2005 | Ziehr et al. |
| 2005/0241865 | A1 | 11/2005 | Varenne |
| 2006/0100057 | A1 | 5/2006 | Severinsky et al. |
| 2006/0231305 | A1 | 10/2006 | Severinsky et al. |
| 2006/0250154 | A1 | 11/2006 | Gao |
| 2008/0048457 | A1 | 2/2008 | Patel et al. |
| 2008/0251235 | A1 | 10/2008 | Zhou |
| 2009/0024256 | A1 | 1/2009 | Adams et al. |
| 2009/0139781 | A1 | 6/2009 | Straubel |
| 2009/0153087 | A1 | 6/2009 | Lim |
| 2009/0227194 | A1 | 9/2009 | Johnston |
| 2009/0256517 | A1 | 10/2009 | Baglino et al. |
| 2009/0280395 | A1 | 11/2009 | Nemesh et al. |
| 2009/0284204 | A1 | 11/2009 | Colby |

OTHER PUBLICATIONS

Written opinion of the international searching authority, Song Hong Seok, Feb. 9, 2012 (contains abstract of 10-2009-0101015).

* cited by examiner

US 8,773,058 B2

ROTOR TEMPERATURE ESTIMATION AND MOTOR CONTROL TORQUE LIMITING FOR VECTOR-CONTROLLED AC INDUCTION MOTORS

CROSS REFERENCE TO RELATED APPLICATIONS

This application claims the benefit of U.S. Provisional Application No. 61/362,312, filed 8 Jul. 2010.

BACKGROUND OF THE INVENTION

The present invention relates generally to electric motors, and more specifically, but not exclusively, to estimating a critical temperature of a vector-controlled AC induction motor.

In a traction drive for an electric vehicle (EV), a load and a speed of the drive is user dependent. This is in contrast to other uses of traction drives where the load and speed are set by the type of application and installation details. EV traction drives have high peak to continuous power ratios, and include temperatures for various components that can vary widely. To prevent damage to a component of the traction drive due to temperature, sometimes a motor controller regulates output power within the limits of a thermally limiting component.

Depending upon many factors including design and implementation, for many motors it is possible to obtain desirable performance levels through simple-to-achieve thermal measure of a motor component (e.g., stator windings of the motor). The motor controller uses this direct thermal measurement to regulate output power and protect the entire motor from damage due to excess temperature.

However, depending on electromagnetic design, geometry, and cooling system choices, such a measurement may not indicate the thermally limiting component in all circumstances. Characterization of the electric motor may indicate that maintaining the temperature of the stator windings within the thermal limits of stator winding insulation may not maintain other components within their appropriate thermal limits (e.g., components thermally coupled to a rotor of the electric motor).

For instance, while the components of an AC induction squirrel cage rotor can operate at high temperatures (i.e., shaft, magnetic steel, bars/aluminum), there are bearings that are thermally well-coupled to the rotor shaft and these bearings typically have a much lower operating temperature limit than the other components. In this AC induction motor, it is extremely hard to measure directly the temperature of the rotor or the bearings. Additionally, many methods of directed rotor and bearing cooling come with efficiency penalties or mechanical design challenges. Thus, in such a system where a primary thermal rejection path for the rotor is via convection across an air gap to the stator, it is critical to have some quantification of the temperature of the thermally limiting component (e.g., the bearing(s)).

Without direct measurement of the bearing temperature, the motor controller could use a direct thermal measurement of another component of the motor and limit output power according to some relationship between the temperature of the measurable component and the temperature of the thermally limiting component. Sometimes this is referred to as a proxy, as in the directly measurable component serves as a proxy for the component which is not measurable or measured. The more thermally remote and inaccurate the proxy relationship, the more inefficient the motor controller will be in regulating the output power. Often this means the performance of the motor is not optimal as its performance is limited more than necessary to allow for a sufficient safety margin.

To improve this situation, and allow more optimization in electric motor performance and design, one either must find a better proxy (which may not be available), directly measure the critical component (which can introduce different complications and undesirable inefficiencies), and/or estimate the temperature of the critical component, which in the case of the bearings would extend their serviceable life.

In many conventional systems, a motor's continuous power is characterized based on information available from direct thermal measurements only. Doing so, especially in designs with no direct rotor cooling and widely varying inlet air temperature (results in widely varying stator heat rejection), results in poor reliability or performance as a compromise between worst and best case delta temperature between directly measured thermals and limiting, non-measured, components is achieved. To reduce the need for such compromises, what is needed is a system and method including a runtime thermal model that estimates individual component temperatures, permitting the system to only limit power when necessary or desirable.

BRIEF SUMMARY OF THE INVENTION

Disclosed is a system and method including a runtime thermal model that estimates individual component temperatures, permitting the system to only limit power when necessary or desirable. The following summary of the invention is provided to facilitate an understanding of some of technical features related to estimating individual component temperatures in an electric motor, and is not intended to be a full description of the present invention. A full appreciation of the various aspects of the invention can be gained by taking the entire specification, claims, drawings, and abstract as a whole.

A power-limiting system for a vector-controlled AC induction motor includes a torque command system for generating a torque command; a thermal protection system determining a runtime estimate for a temperature of a component of a rotor of the vector-controlled AC induction motor; and a controller configured to generate a motor control signal for the vector-controlled AC induction motor responsive to the torque command, wherein the thermal protection system determines the runtime temperature estimate responsive to a multi-node thermal model of the vector-controlled AC induction motor, and wherein the controller limits output power, torque, or phase current of the vector-controlled AC induction motor to maintain the temperature below a critical temperature.

A method for operating an electric vehicle includes a) propelling the electric vehicle using a vector-controlled AC induction motor responsive to a motor control signal wherein the vector-controlled AC induction motor includes a stationary electro-magnetic component (stator) and a co-axial rotational electro-magnetic component (rotor) to generate a propulsion torque; and b) controlling the vector-controlled AC induction motor using a controller having a control algorithm responsive to a torque command signal, wherein the controller is configured to selectively limit output power, torque, or phase current of the AC induction motor responsive to a runtime estimated temperature of a component of the rotor during operation of the AC induction motor.

Implementations of preferred embodiments of the present invention do not require knowledge of ambient temperature, or the means of cooling of the stator. Additionally, the use of field oriented control allows one to accurately predict dissipation in the rotor bars while measuring only stator currents. Further, the use of only two empirically derived thermal impedances and capacitances allows for simple implementation in the motor controller and easy validation.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method including a runtime thermal model that estimates individual component temperatures, permitting the system to only limit power when necessary or desirable. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

There are many ways to provide torque control for the electric motor of an EV. A preferred implementation of a torque control using modulation of a flux linkage (flux) is described in U.S. Pat. No. 7,847,501 entitled "VARYING FLUX VERSUS TORQUE FOR MAXIMUM EFFICIENCY" filed 7 Mar. 2008 which is hereby expressly incorporated herein by reference in its entirety for all purposes. That patent describes flux control to increase efficiency or decrease the power loss of the EV throughout its operating range. The present invention preferably includes a field-oriented motor controller similar to that disclosed in the incorporated patent application as detailed herein.

Figure 1:
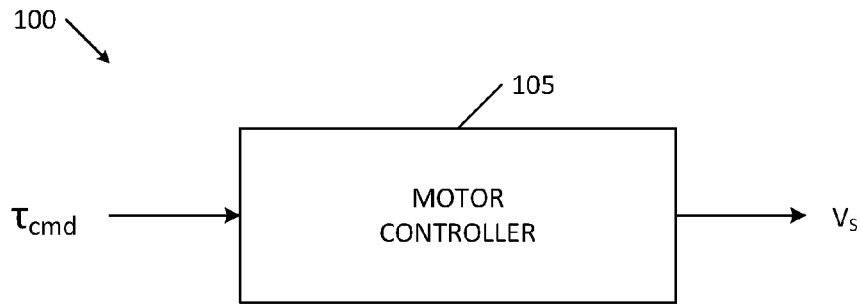
FIG. 1 illustrates generally a block diagram of a system including a motor controller.

FIG. 1 illustrates a generally a block diagram of a system 100 including a motor controller 105. Motor controller 105 is configured to receive a torque command value ($\tau_{cmd}$) and output a control signal ($V_s$) for controlling a motor of an EV. Motor controller 105 may include a device or one or more electrical components configured to control the performance of a motor. In certain examples, motor controller 105 includes an electric machine controller configured to control the performance of an electric machine, such as a generator or other electric machine.

The torque command value includes, or may otherwise be derived using, information from a throttle or other EV speed or torque input (e.g., input from a user). In certain examples, the torque command value is taken directly from the input from the user, or the torque command value is modulated, such as by filtering the user input to obtain a smoother or more realistic response or acceleration, a more constant or stable speed or torque, or to apply one or more other driving features, such as traction control or cruise control.

Generally, an EV includes certain components, such as a propulsion electric motor, a power source (e.g., a battery or other energy source), drive electronics, a power delivery system (e.g., a transmission), and other vehicle systems appropriate for the EV application. Typically the drive electronics include motor controller 105, an inverter, and other components. There are different types of electric motors available for an EV including an alternating current (AC) induction motor, a synchronous AC motor, a direct current (DC) motor, a stepper motor, or other type of electric motor capable of providing power to propel the EV. The EV is not limited to "traditional" terrestrial vehicles and may include all manner of vehicle whether ground based, aquatic based, air based, or other based vehicle capable of being propelled using a motor.

Figure 2:
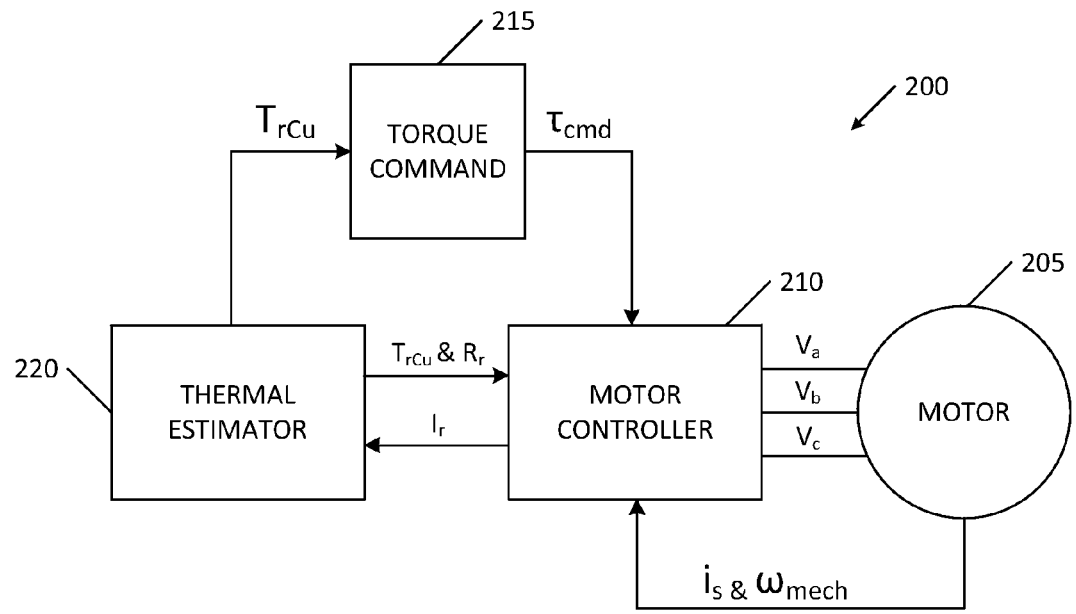
FIG. 2 illustrates generally a block schematic diagram for a representative system including a motor and a motor controller.

FIG. 2 illustrates generally a block schematic diagram for a representative system 200 including a motor 205 and a motor controller 210. Motor 205 is preferably a polyphase AC induction electric motor. Motor controller 210 is preferably a field oriented motor controller responsive to a torque command ($\tau_{cmd}$) to set desired levels for the output control voltages for each phase (in this example for a three-phase motor, control voltages are $V_a$, $V_b$, and $V_c$).

Motor controller 210 is configured to output the control signals using an integrated inverter (not shown). The inverter includes one or more electronic circuits or components configured to convert DC power to AC power. In some embodiments there will be a discrete inverter for generation of the motor control signals. Either implementation may benefit from the present invention.

There are many ways to implement thermal protection/power-limiting features and the description herein describes a generic thermal estimator 220 that calculates a temperature of a critical component and provides the temperature to a torque command calculator 215 to be used in a temperature-driven power, torque, or current limit algorithm. This algorithm is preferably implemented in torque command calculator 215. The estimation and use of the estimate may be integrated in one more components of the system, or completely distributed, or aggregated in other ways than shown herein. FIG. 2 simply identifies the preferred sub-systems and their interrelationships.

One example of a simple torque limiter provides a proportional limit as a function of estimated rotor (copper) temperature. Torque command calculator 215 provides 100% torque up to a target temperature (e.g., estimated rotor temperature less than or equal to 250 degrees C.). In a range of greater estimated temperatures, torque is limited linearly from 100% at 250 degrees C. to 15% of full torque at 300 degrees C.

Figure 3:
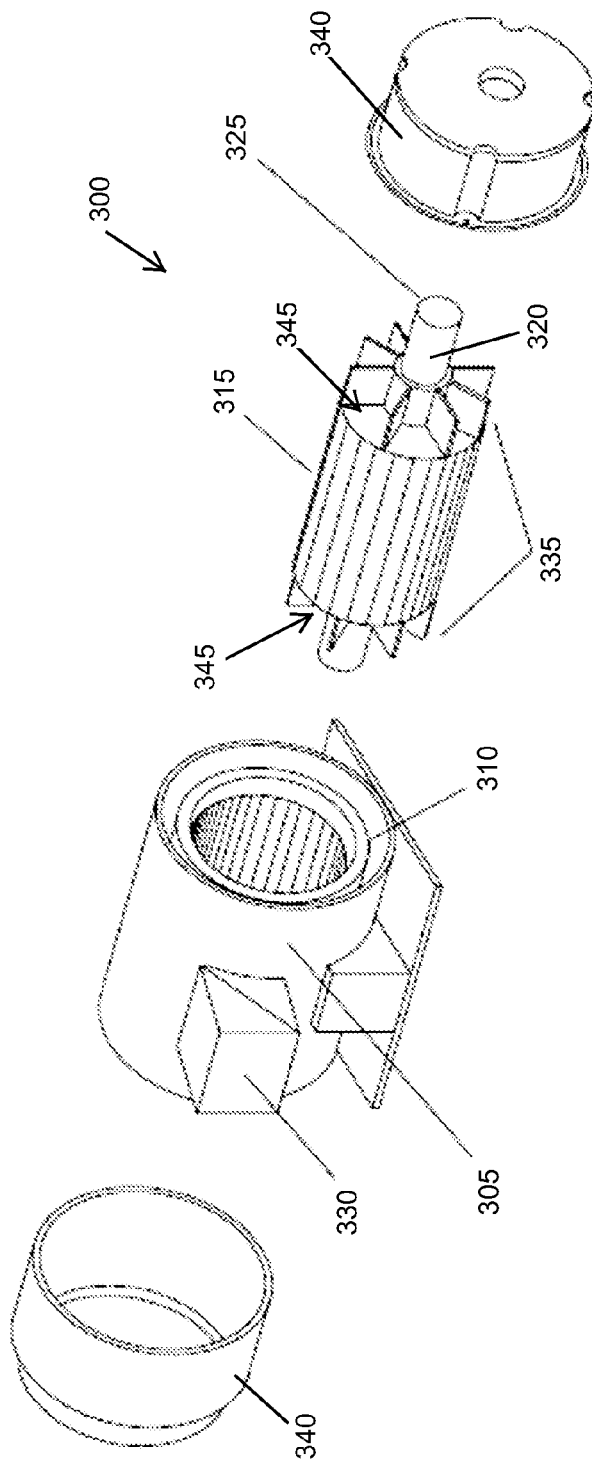
FIG. 3 illustrates generally assembly details of an AC induction motor.

FIG. 3 illustrates generally assembly details of an AC induction motor 300. Motor 300 includes a motor frame 305 housing a fixed stator 310. A rotor 315 nests within stator 310 and includes a shaft 320 supported by at least one bearing 325 when motor 300 is assembled. A wiring cover 330 provides a cover for a wire port through which electrical connection is made to stator 310. Other components of motor 300 can include one or more fan blades 335 and an end-cap enclosing frame 340. As further described below, rotor 315 includes a pair of end-rings 345 disposed at opposite ends.

Figure 4:
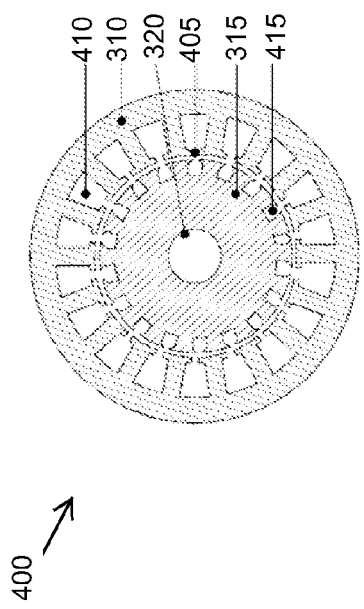
FIG. 4 illustrates generally sectional-view details of the stator and rotor of the AC induction motor shown in FIG. 3.

FIG. 4 illustrates generally sectional-view details of a section 400 of motor 300 including stator 310 and rotor 315. Section 400 further includes an air gap 405 separating stator 310 from rotor 315. Stator 310 includes a plurality of stator slots 410 and rotor 315 includes a plurality of rotor slots 415.

Stator 310 and rotor 315 are typically formed of a stack of insulated laminated steel plates to reduce eddy currents, lower losses, and lower heating. A set of insulated electrical stator windings are placed inside slots 410 to generate the desired magnetic fields, one set for each phase.

Rotor 315 includes an embedded "squirrel cage" (not shown) which includes a plurality of longitudinal conductive rotor bars joined at the ends by the pair of annular conductive end-rings 345. The conductor is preferably copper, though aluminum or another conductor may be used. The rotor bars are located in rotor slots 415. (End-rings 345 may be disposed between fan blades 335 and a body of rotor 315 shown in FIG. 3 with the bars extending between end-rings 345.) Of course there are many different implementations for motor 300 and the specifics of any particular configuration and application may require some adaptation of the present invention described herein.

As noted above, it is possible to directly measure a temperature of stator 310. However, measuring any particular part of rotor 315 is challenging, particularly when it is desirable to reduce weight and complexity, and increase performance, efficiency, and reliability of motor 300. Operation of motor 300 results in high thermal conditions, and in some implementations, end-rings 345 experience the greatest temperature. Heat is variously generated and transferred to and from different components. For example, heat generated in rotor 315 may be dissipated to stator 310 across air gap 405, permitting some cooling. Heat generated in end-rings 345 flows not only through the rotor bars to the laminations to the air gap 405, but also through the rotor bars to the laminations to the shaft 320 and then to bearings 325.

In this particular case, it will be assumed that the bearings are the critical component and operation of motor 300 must be operated to avoid having bearing 325 reach or exceed a critical temperature. As noted herein, it is undesirable to attempt to directly measure the temperature of bearing 325 so the preferred implementation provides an estimation of the bearing temperature. As it turns out, while it is possible to estimate the bearing temperature using the thermal modeling principles described herein, in the present case doing so results in unnecessary complications because of the relatively complicated thermal pathways from the heat generating sources to bearings 325.

In some appropriate cases, some of the complexities associated with thermal modeling may be reduced by finding a suitable proxy for bearings 325. For the preferred embodiment, estimating the temperature of end-rings 345 provides a very good proxy for the temperature of bearings 325. Estimating the temperature of end-ring 345 is further detailed below in the discussion of FIG. 5.

Figure 5:
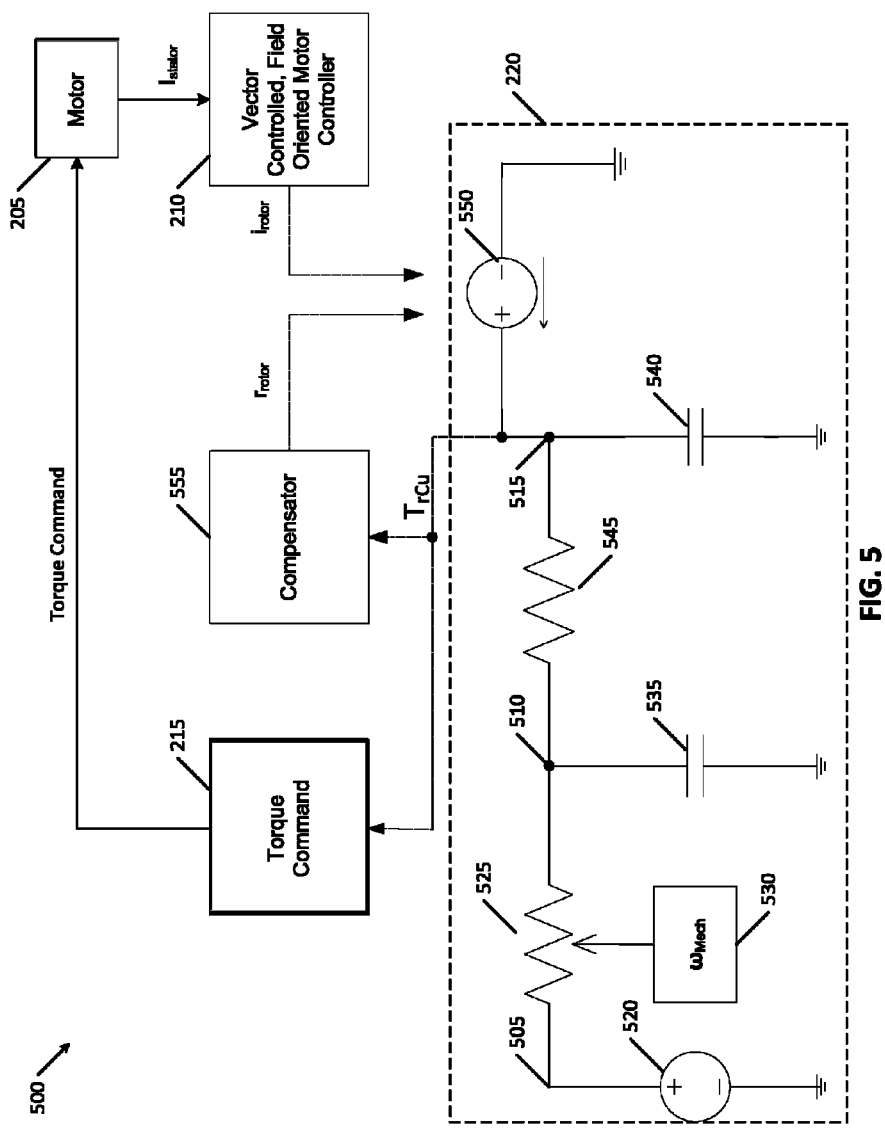
FIG. 5 illustrates generally a three-node thermal model used in estimating components of the AC induction motor.

FIG. 5 illustrates generally a three-node thermal network model 500 used in estimating components of AC induction motor 300 shown in FIG. 3. Model 500 includes three lumped thermal nodes with a goal of estimating rotor copper (e.g., end-ring 345 and longitudinal rotor bars coupled to end-rings 345) temperature: a lumped stator winding/steel temperature node 505, a lumped rotor steel node 510, and a lumped rotor copper/end ring node 515.

Thermal elements of model 500 further include a measured stator winding temperature 520 determining node 505 temperature and a variable air gap thermal impedance 525 coupling node 505 to node 510. Thermal impedance 525 is affected by mechanical angular speed of motor 300 and is set by a mechanical rotation 530. Model 500 also includes a thermal capacitance 535 of the steel in rotor 315 determining node 510 temperature and includes a thermal capacitance 540 of the copper in rotor 315 determining node 515 temperature. Model 500 further includes a thermal impedance 545 of rotor steel to rotor copper that couples node 510 to node 515.

An estimated rotor copper dissipation is shown as a heat source 550 introduced at node 515 in thermal network model 500. The temperature of node 515 is estimated and is used by a compensator 555 to compensate for temperature effects on resistance of the rotor conductors to determine a real-time electrical resistance ($r_{rotor}$) of the rotor copper. Real-time current ($i_{stator}$) of stator 310 is measured on motor 205 and provided to motor controller 210. When motor controller 210 is a vector-controlled, field-oriented controller, then it likely has all the quantities to determine a real-time rotor current ($i_{rotor}$).

As the incorporated '501 patent explains, analysis of induction motors with a space vector model is complicated due to the requirement of using complex numbers. The '501 patent uses a D-Q dynamic model of induction motors for vector control. FIG. 3 through FIG. 5 of the '501 patent include references to the Q-axis and the D-axis of the dynamic model. A Q-axis rotor current ($I_{qr}$) calculation can be derived using two machine parameters—motor inductance ($L_m$) and rotor inductance ($L_r$)—in (–6) in addition to $i_{qmeas}$, the torque producing current in the stator reference frame found in FIG. 3 through FIG. 5 of the '501 patent. $I_{qr}=-(L_m/L_r)*i_{qmeas}$. D-axis rotor current ($I_{dr}$) is calculated: $I_{dr}=\lambda_{dr}-L_m I_{ds})/L_r$. $I_{ds}$ and $\lambda_{dr}$ are discussed in the incorporated '501 patent. $I_{ds}$ is the flux-producing current determined in the rotating reference frame converter 145 of FIG. 5 of the '501 patent. $\lambda_{dr}$ is the direct component of the rotor flux estimate ($\lambda_{er}$ provided from rotor flux estimator 130 shown in FIG. 4 of the '501 patent). Rotor flux can be calculated/estimated in a variety of ways in a field oriented controller. With these quantities defined, $i_{rotor}$ can be calculated as the square root of the sum of $I_{qr}^2$ and $I_{dr}^2$.

With $i_{rotor}$ known, power dissipated in the rotor copper can be determined as $i_{rotor}*i_{rotor}*r_{rotor}$ ($i^2R$—standard equation for power dissipated in a resistor). The thermal model estimated temperature for copper has been shown to be an accurate proxy for the temperature of bearing 325. Torque command calculator 215 uses the estimated rotor copper temperature to assure that critical temperature of critical components (e.g., bearing 325) is not met or exceeded during operation of motor 300. Motor controller 210 may use the estimated $r_{rotor}$ to determine rotor or stator flux for field orientation.

Dissipation is modeled in node 515 from runtime calculation of rotor currents and runtime calculation of rotor resistance as a function of rotor copper material properties and estimated temperatures. Rotor currents are estimated by motor controller 210 using direct runtime measurements of stator current. Thermal impedance 545 from rotor copper to rotor steel is characterized prior to runtime and is determined empirically. Thermal impedance 525 from rotor steel across the air gap to the stator winding is an empirical function of runtime-measured rotor mechanical speed. The estimated rotor copper temperature 515 is used as an additional input to a thermally-driven proportional, proportional-integrative, or other power or current limit process in torque command calculator 215. Specifics of the process are dependent upon implementation, application, and characterization of the components of motor 300.

The preferred embodiments of the present invention are advantageous because the rotor temperature estimation does not require knowledge of ambient temperature, or the means of cooling of the stator. Additionally, the use of field oriented control by motor controller 210 allows one to accurately predict dissipation in the rotor copper while measuring only stator currents. Finally, the use of only two empirically derived thermal impedances (impedance 525 and impedance 545) and thermal capacitances (capacitance 535 and capacitance 540) allows for simple implementation in motor controller 210 and easy validation.

As noted herein, the system and process are most preferably implemented in a vector-controlled AC induction motor, and more preferably in an electric vehicle using such a motor for propulsion. Other implementations and applications will find the teachings and preferred embodiments disclosed herein to be advantageous.

The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An electric vehicle, comprising:
   an AC induction motor for propelling the electric vehicle responsive to a motor control signal wherein said AC induction motor includes a stationary electro-magnetic component having an aperture including an axis and a rotational electro-magnetic component disposed within said aperture and co-axial with said axis to generate a propulsion torque; and
   a controller having a control algorithm for controlling said AC induction motor in response to a torque command signal, wherein said controller is configured to selectively limit a power of said AC induction motor responsive to a runtime estimated temperature of a component of said rotational electro-magnetic component during operation of said AC induction motor;
   wherein said control algorithm includes a thermal model that includes a pre-runtime characterization of one or more thermal properties of said rotational electro-magnetic component, a runtime direct measurement of a temperature of a component of said stationary electro-magnetic component, and a runtime direct measurement of a current in said stationary electro-magnetic component.

2. The electric vehicle of claim 1 wherein said runtime estimated temperature is responsive to said thermal model including an estimated power dissipation in said component of said rotational electro-magnetic component determined from a calculated current in said component of said rotational electro-magnetic component and a calculated electric resistance of said component of said rotational electro-magnetic component.

3. The electric vehicle of claim 2 wherein said calculated current is a function of said current in said stationary electro-magnetic component and wherein said calculated rotational electro-magnetic component electric resistance is responsive to one or more material properties of said component of said rotational electro-magnetic component and to said runtime estimated temperature.

4. A power-limiting system for a vector-controlled AC induction motor, comprising:
   a torque command system for generating a torque command;
   a thermal protection system determining a runtime estimate for a temperature of a component of a rotational electro-magnetic component of the vector-controlled AC induction motor; and
   a controller configured to generate a motor control signal for the vector-controlled AC induction motor responsive to said torque command, wherein
   said thermal protection system determines said runtime estimate responsive to a multi-node thermal model of the vector-controlled AC induction motor that includes a runtime direct measurement of a temperature of a component of a stationary electro-magnetic component of the vector-controlled AC induction motor, and a runtime direct measurement of a current used by said stationary electro-magnetic component, and wherein said controller limits a power of the vector-controlled AC induction motor to maintain said temperature below a critical temperature.

5. The system of claim 4 wherein said multi-node thermal model further includes a pre-runtime characterization of heat rejection from one or more components of said rotational electro-magnetic component.

6. The system of claim 4 wherein said runtime estimate is a function of said multi-node thermal model including an estimated power dissipation in said component of said rotational electro-magnetic component determined from a calculated current in said component of said rotational electro-magnetic component and a calculated electrical resistance of said component of said rotational electro-magnetic component.

7. The system of claim 6 wherein said calculated current is a function of said current in said stationary electro-magnetic component and wherein said calculated rotational electro-magnetic component electric resistance is responsive to one or more material properties of said component of said rotational electro-magnetic component and to said runtime estimate.

8. A method for operating an electric vehicle, the method comprising the steps of:
   a) propelling the electric vehicle using a vector-controlled AC induction motor responsive to a motor control signal wherein said vector-controlled AC induction motor includes a stationary electro-magnetic component and a cooperating rotational electro-magnetic component rotating within said stationary electro-magnetic component to generate a propulsion torque; and
   b) controlling said vector-controlled AC induction motor using a controller having a control algorithm responsive to a torque command signal, wherein said controller is configured to selectively limit a power of said vector-controlled AC induction motor responsive to a runtime estimated temperature of a component of said rotational electro-magnetic component during operation of said vector-controlled AC induction motor, the runtime estimated temperature based on a runtime direct measurement of a temperature of a component of said stationary electro-magnetic component, and a runtime direct measurement of a current in said stationary electro-magnetic component.

9. The method of claim 8 wherein said control algorithm includes a thermal model that includes a pre-runtime characterization of one or more thermal properties of said rotational electro-magnetic component.

10. The method of claim 9 wherein said runtime estimated temperature is a function of said thermal model including an estimated power dissipation in said component of said rotational electro-magnetic component determined from a calculated current in said component of said rotational electro-magnetic component and a calculated electric resistance of said component of said rotational electro-magnetic component.

11. The method of claim 10 wherein said calculated current is a function of said current in said stationary electro-magnetic component and wherein said calculated rotational electro-magnetic component electrical resistance is responsive to one or more material properties of said component of said rotational electro-magnetic component and to said runtime estimated temperature.

* * * * *